(12) United States Patent
Matczak (10) Patent No.: US 10,920,888 B2
(45) Date of Patent: Feb. 16, 2021

(54) AXLE SEAL HAVING A MULTI-EDGE CONTACT

(71) Applicant: SEALS-IT, INC., Ellington, CT (US)

(72) Inventor: Stanley E. Matczak, Somers, CT (US)

( * ) Notice: Subject to any disclaimer, the term of this patent is extended or adjusted under 35 U.S.C. 154(b) by 0 days.

(21) Appl. No.: 16/040,526

(22) Filed: Jul. 19, 2018

(65) Prior Publication Data
US 2018/0328493 A1    Nov. 15, 2018

Related U.S. Application Data (63) Continuation-in-part of application No. 15/388,068, filed on Dec. 22, 2016, now abandoned.

(60) Provisional application No. 62/534,507, filed on Jul. 19, 2017.

(51) Int. Cl.
| | |
|---|---|
| *F16J 15/3284* | (2016.01) |
| *F16J 15/3216* | (2016.01) |
| *F16J 15/3232* | (2016.01) |
| *F16J 15/3236* | (2016.01) |
| *F16H 57/029* | (2012.01) |

(52) U.S. Cl.
CPC ........ *F16J 15/3284* (2013.01); *F16H 57/029* (2013.01); *F16J 15/3216* (2013.01); *F16J 15/3232* (2013.01); *F16J 15/3236* (2013.01)

(58) Field of Classification Search
CPC .... F16J 15/3284; F16J 15/3268; F16J 15/328; F16J 15/32; F16J 15/3216; F16J 15/3204; F16J 15/3232; F16J 15/3292; F16J 15/3236; F16H 7/029

USPC ......................................................... 277/560
See application file for complete search history.

(56) References Cited

U.S. PATENT DOCUMENTS

| | | | | |
|---|---|---|---|---|
| 4,630,834 A | * | 12/1986 | Muller | F16D 3/845 |
| | | | | 277/504 |
| 5,391,004 A | * | 2/1995 | Matczak | B60B 27/001 |
| | | | | 384/477 |
| 2010/0247014 A1 | * | 9/2010 | Ohmori | F16C 19/186 |
| | | | | 384/486 |
| 2011/0304197 A1 | * | 12/2011 | Norimatsu | B60B 27/00 |
| | | | | 301/110 |
| 2013/0241270 A1 | * | 9/2013 | Morita | F16C 33/805 |
| | | | | 301/110 |
| 2014/0003753 A1 | * | 1/2014 | Haepp | F16C 33/7886 |
| | | | | 384/480 |

* cited by examiner

*Primary Examiner* — Nathan Cumar
(74) *Attorney, Agent, or Firm* — Steven M. McHugh (57) ABSTRACT

An axle seal is provided and includes a seal element having a seal element top, a seal element bottom, a seal element mounting lip which extends downwardly from the seal element bottom, and a seal element sleeve, wherein the seal element sleeve is securely and sealingly associated with the seal element mounting lip, and wherein the seal element includes, a first surface having a first edge, and a second surface having a second edge, wherein the first surface and second surface extend circumferentially away from the seal element, and wherein the first surface and second surface are separated from each other to form an edge channel which extends circumferentially around the seal element.

20 Claims, 10 Drawing Sheets

AXLE SEAL HAVING A MULTI-EDGE CONTACT

RELATED APPLICATIONS

This application is related to U.S. Provisional Patent Application Ser. No. 62/534,507 filed Jul. 19, 2017 and entitled "Axle Seal Having a Multi-Edge Contact" and is a continuation-in-part of U.S. Non-Provisional patent application Ser. No. 15/388,068 filed Dec. 22, 2016 and entitled "Axle Seal" and claims the benefit of priority of the filing date of U.S. Provisional Patent Application Ser. No. 62/534,507 and U.S. Non-Provisional patent application Ser. No. 15/388,068, the contents of both of which are incorporated by reference herein in their entirety.

FIELD OF THE INVENTION

The present invention relates generally to a seal and more particularly to a self-sealing axel seal with a dual contact lip for use with an automotive, marine and/or industrial axle.

BACKGROUND OF THE INVENTION

Axle seals are well known in the art and are used on machinery that have a drive train that includes an axle that is connected to a gear box. Typically, the axle seal has two primary functions. The first function is to prevent the gear oil from escaping from the drive train. If the gear oil is allowed to leak from the drive train, the oil would contaminate other various parts of the machinery, such as brake shoes. Additionally, if too much oil is allowed to escape from the drive train, the drive train components, such as the transmission and/or differential, there may not be enough oil to lubricate the drive train components causing them to overheat. The second function is to prevent dirt and other contaminants from entering the drive train which could severely damage delicate gears and other components.

Unfortunately however, as current seal designs become worn the interface between the seal and the axle begins to breakdown thereby letting small amounts of oil to escape and allowing some contaminants to enter the drive train. This is undesirable because as the oil within the axle housing becomes depleted, there is less lubrication between the drive train components and thus, the drive train components experience a greater amount of frictional wear due to overheating and under-lubrication. Additionally, as contaminants, such as sand, dirt and other particles, enter the drive train, these contaminants cause additional wear and structural damage to the drive train components.

SUMMARY OF THE INVENTION

An axle seal is provided and includes a seal element having a seal element top, a seal element bottom, a seal element mounting lip which extends downwardly from the seal element bottom, and a seal element sleeve, wherein the seal element sleeve is securely and sealingly associated with the seal element mounting lip, and wherein the seal element includes, a first surface having a first edge, and a second surface having a second edge, wherein the first surface and second surface extend circumferentially away from the seal element, and wherein the first surface and second surface are separated from each other to form an edge channel which extends circumferentially around the seal element.

An axle seal is provided and includes an axle seal body having a first seal body end and a second seal body end, wherein the axle seal body defines a seal body cavity, a first seal body end opening and second seal body end opening, wherein the first seal body end opening is communicated with the second seal body end opening via the seal body cavity; and a seal element having a seal element top, a seal element bottom, a seal element mounting lip which extends downwardly from the seal element bottom, and a seal element sleeve, wherein the seal element sleeve is securely and sealingly associated with the seal element mounting lip, and wherein the seal element includes, a first surface having a first edge, and a second surface having a second edge, wherein the first surface and second surface extend circumferentially away from the seal element, and wherein the first surface and second surface are separated from each other to form an edge channel which extends circumferentially around the seal element.

A seal element for an axle seal is provided and includes a seal element top, a seal element bottom, a seal element mounting lip which extends downwardly from the seal element bottom, and a seal element sleeve, wherein the seal element sleeve is securely and sealingly associated with the seal element mounting lip, and wherein the seal element includes, a first surface having a first edge, and a second surface having a second edge, wherein the first surface and second surface extend circumferentially away from the seal element, and wherein the first surface and second surface are separated from each other to form an edge channel which extends circumferentially around the seal element.

BRIEF DESCRIPTION OF THE DRAWINGS

The foregoing and other features and advantages of the present invention will be more fully understood from the following detailed description of illustrative embodiments, taken in conjunction with the accompanying drawings in which like elements are numbered alike.

DETAILED DESCRIPTION OF THE INVENTION

In accordance with the present invention, an axle seal for use with automotive, marine and/or industrial machinery having an axle is provided and discussed herein with regards to an axle for an automobile. It should be appreciated that in one embodiment, the unique multi-edge axle seal of the present invention may be used on vehicles that operate in dirt or mud, such as a vehicle that races on dirt and/or mud tracks. The unique and novel design of the multi-edge axle seal of the present invention acts to keep dirt, mud and other contaminants out of the axle housing, thereby minimizing damage and/or wear and tear. It should be further appreciated that although the axle seal of the present invention is discussed herein with regards to an automobile axle, the axle seal of the present invention may be used with any type of axle suitable to the desired end purpose.

Figure 1:
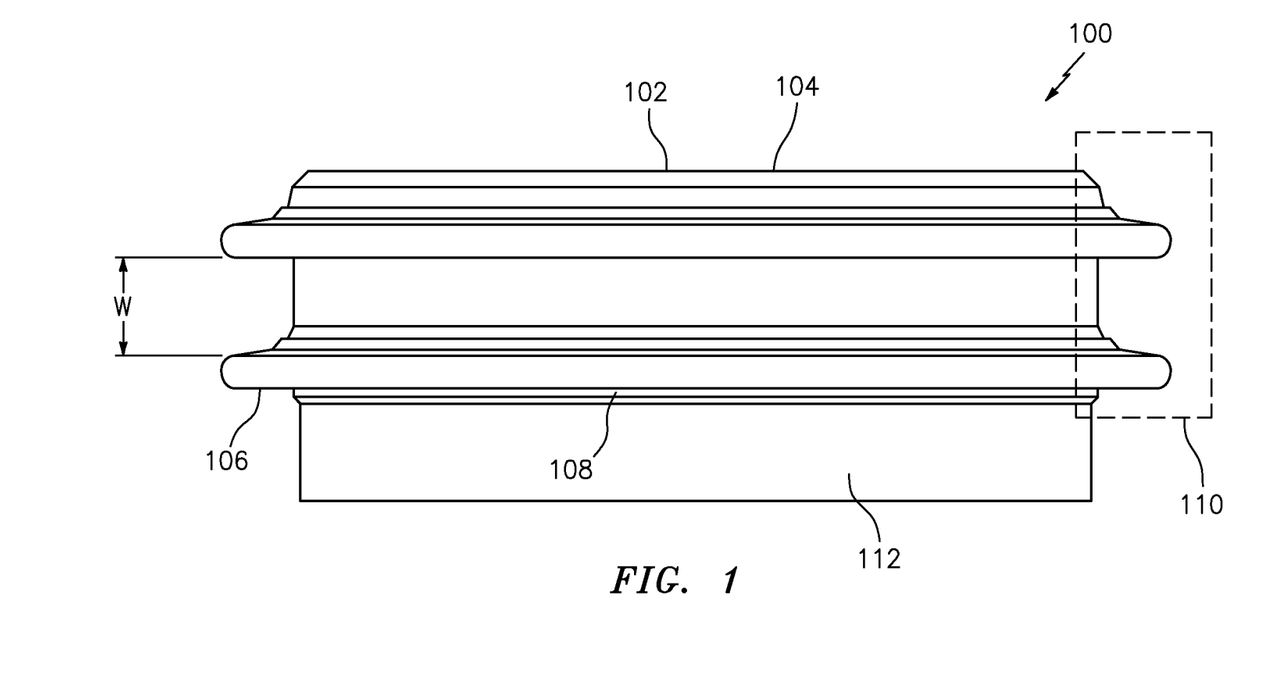
FIG. 1 is a side view of a multi-edge axle seal for axles, in accordance with one embodiment of the invention.
Figure 2:
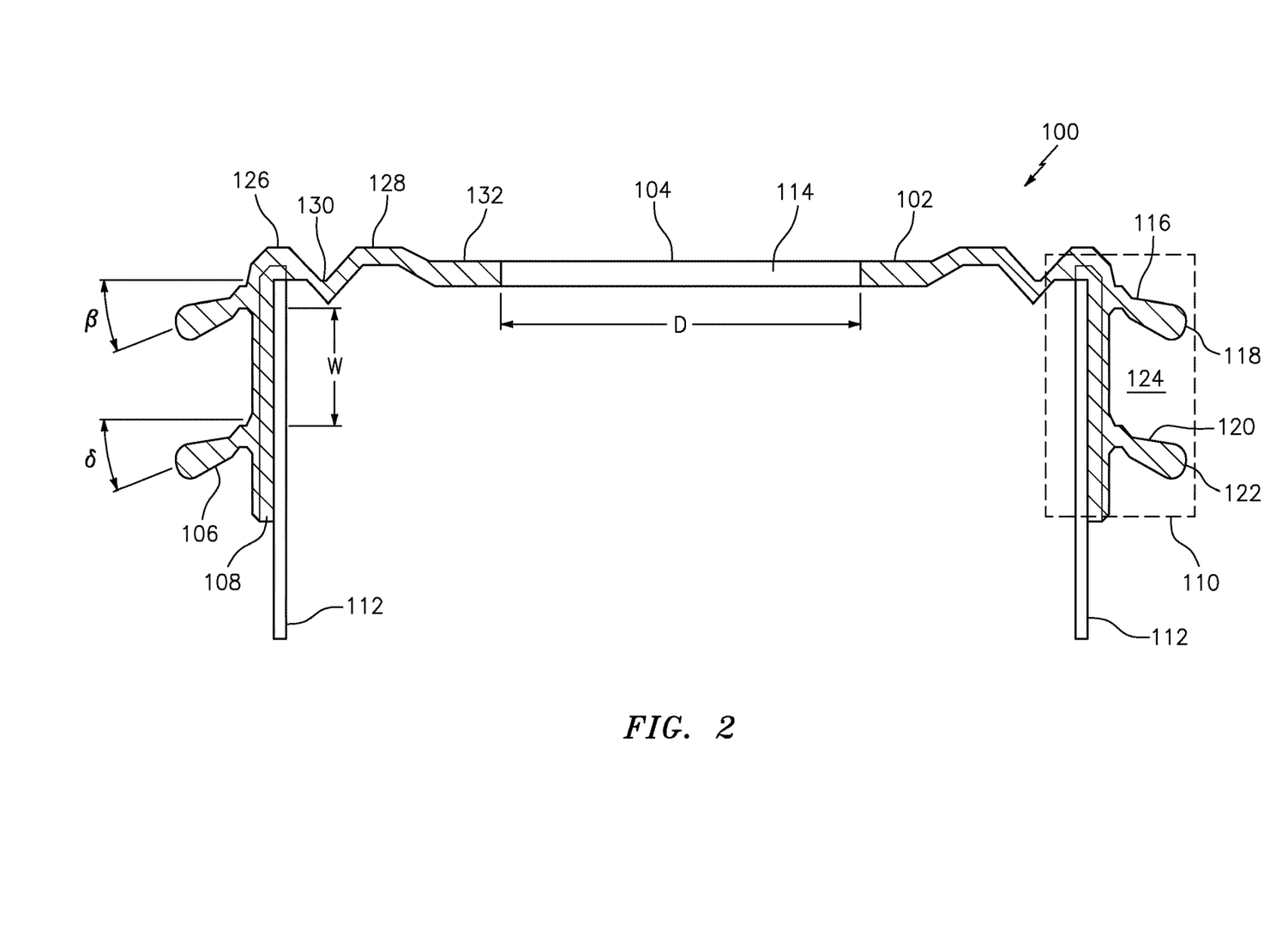
FIG. 2 is a sectional side view of the multi-edge axle seal of FIG. 1.
Figure 3:
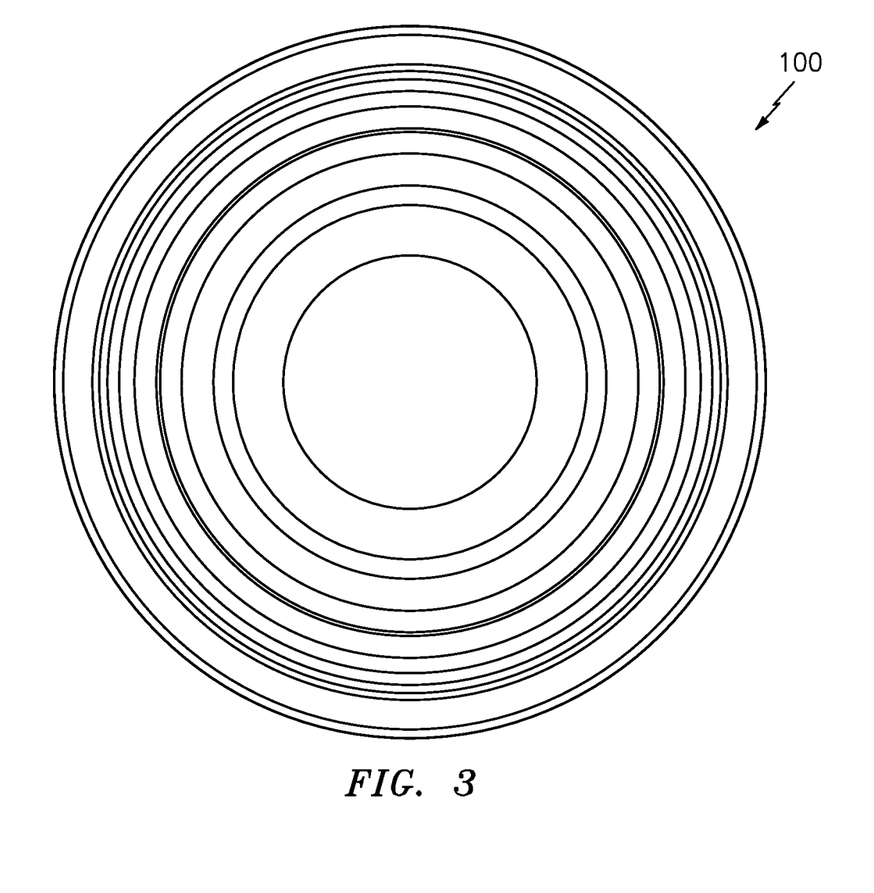
FIG. 3 is a top down view of the multi-edge axle seal of FIG. 1
Figure 4:
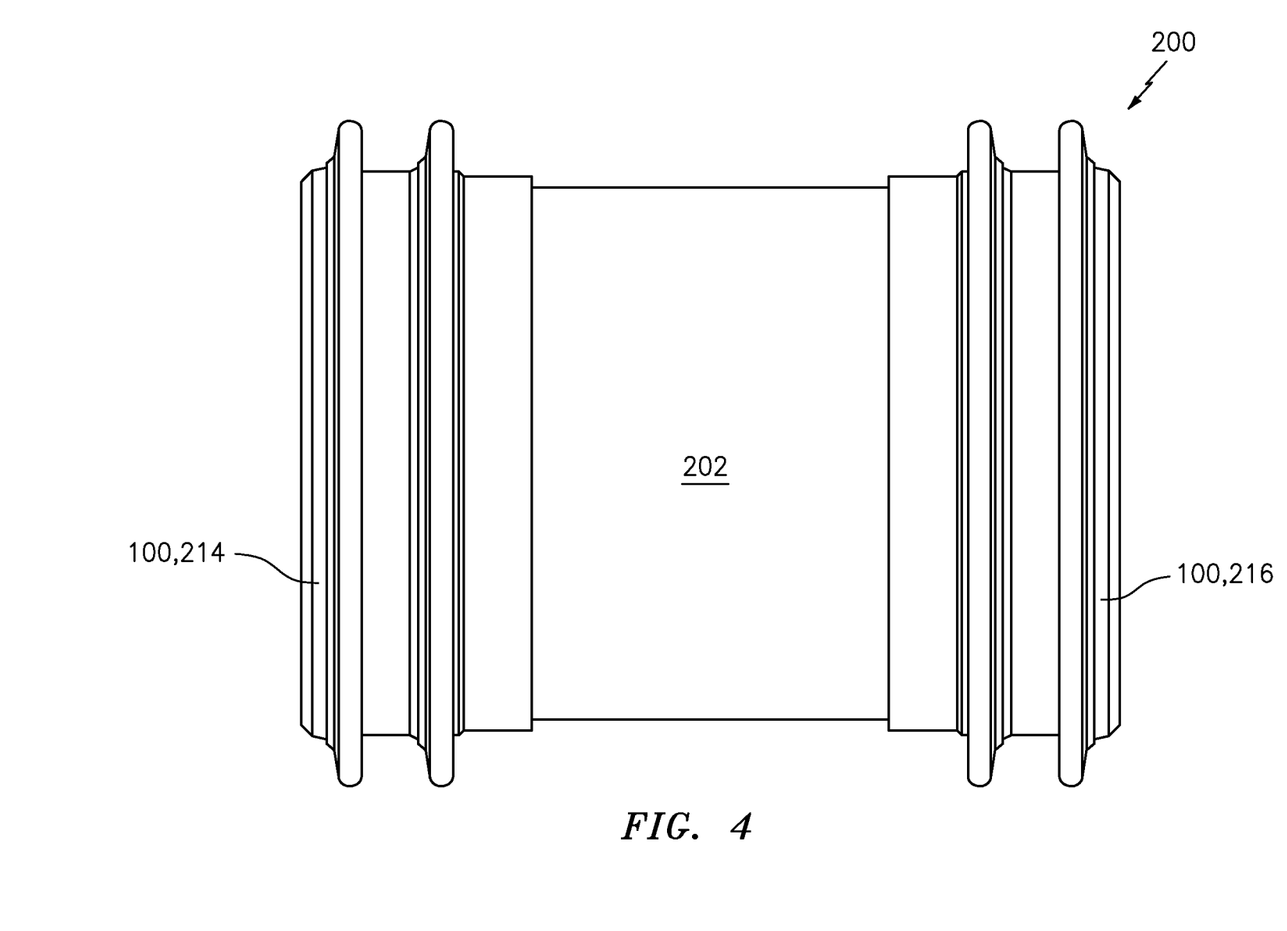
FIG. 4 is a side view of the axle seal assembly incorporating the multi-edge axle seal of FIG. 1, in accordance with one embodiment of the invention.
Figure 5:
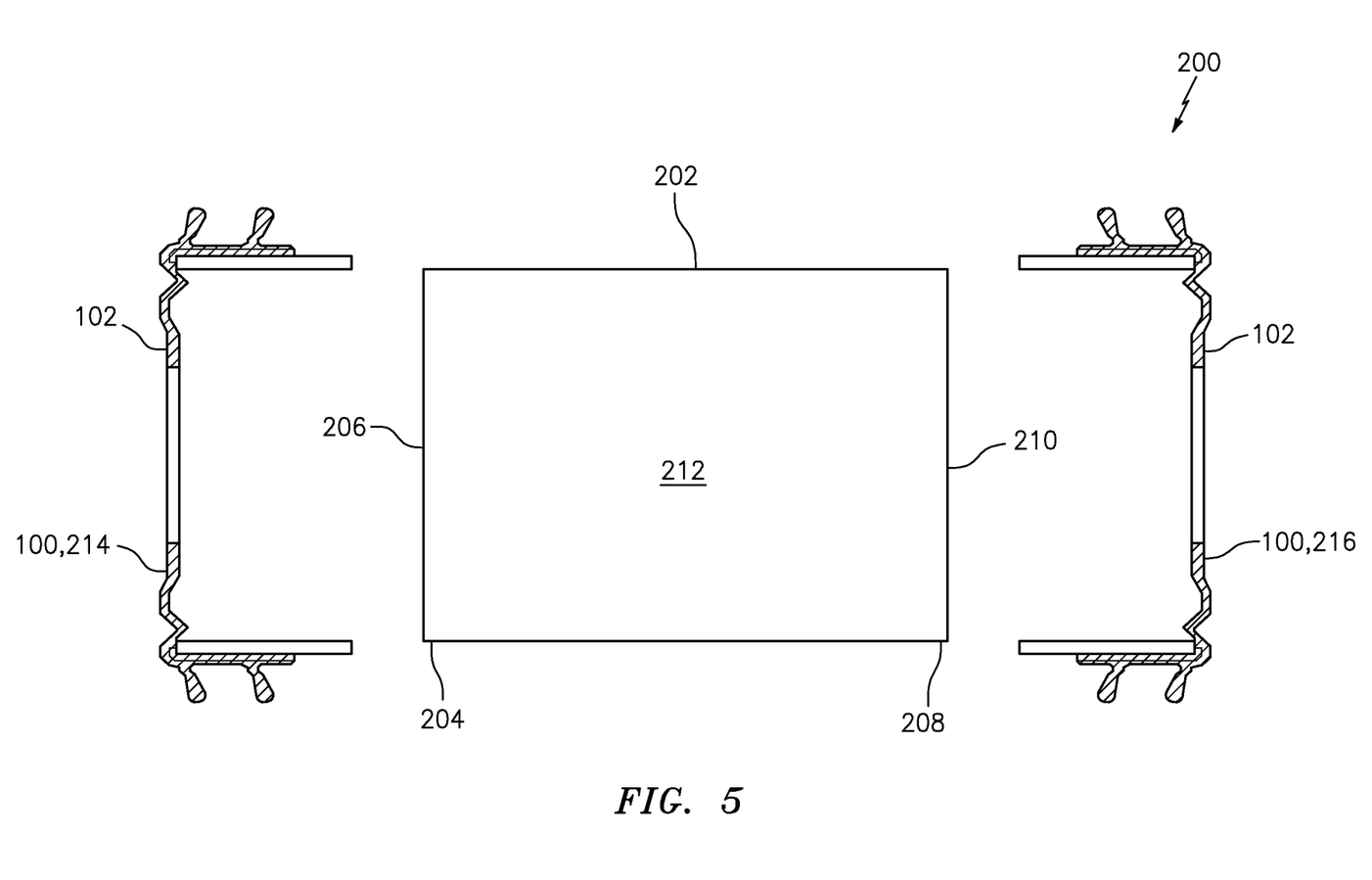
FIG. 5 is an exploded side view of the axle seal assembly of FIG. 4.
Figure 6:
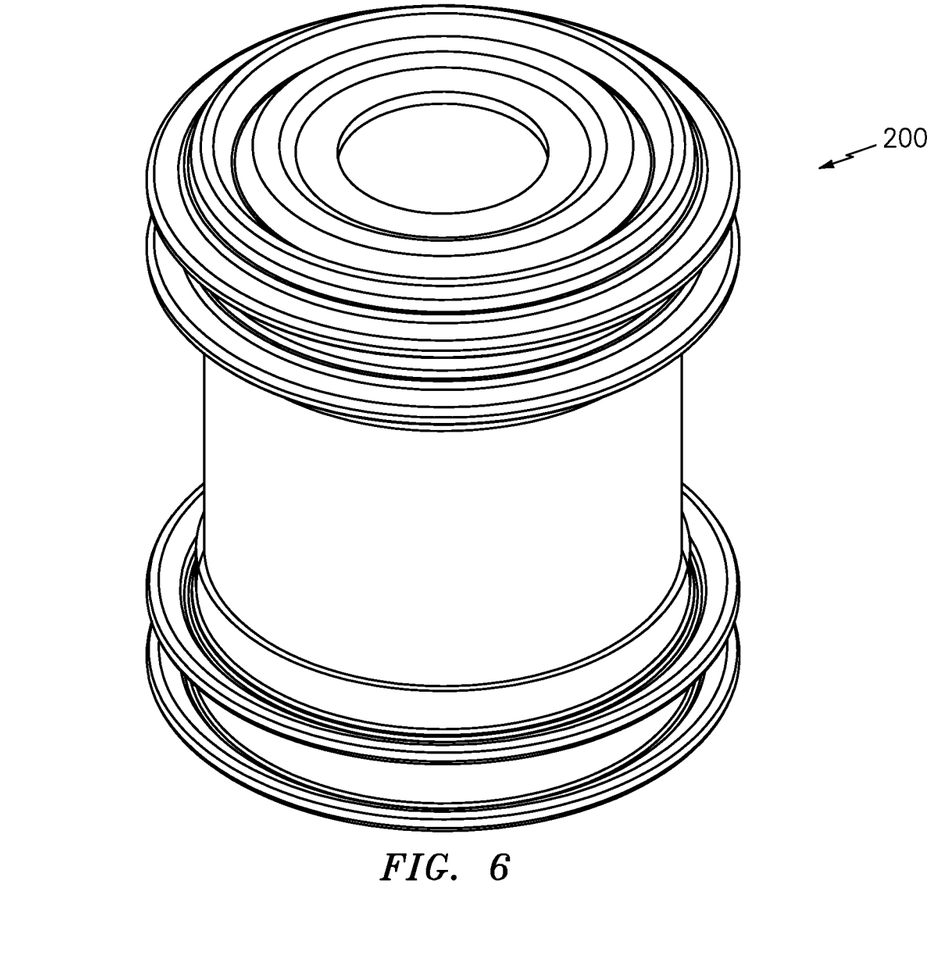
FIG. 6 is a top down side perspective view of the axle seal assembly of FIG. 4.
Figure 7:
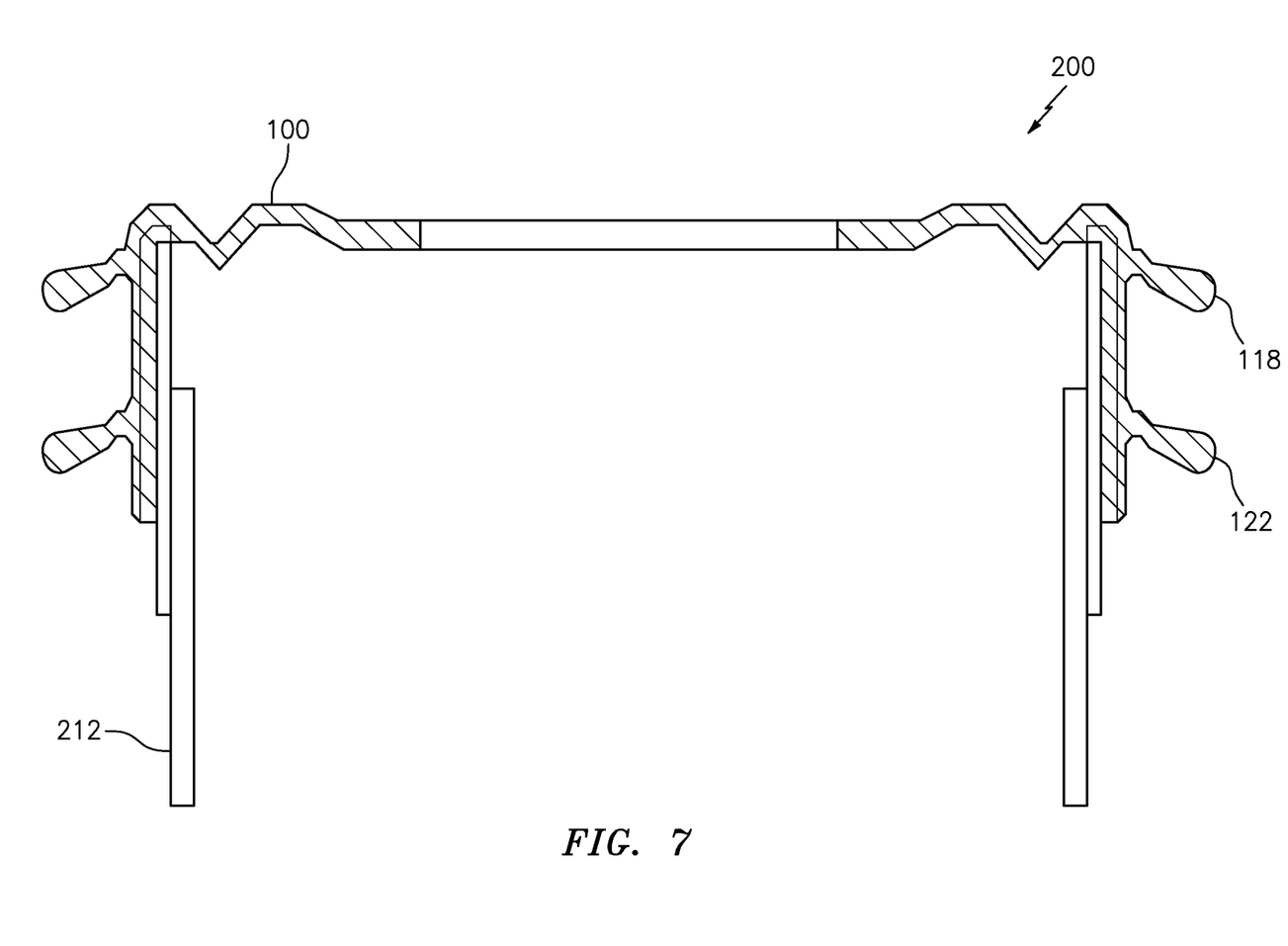
FIG. 7 is a sectional side view of one side of the axle seal assembly of FIG. 4.

Referring to FIG. 1, FIG. 2 and FIG. 3, a multi-edge axle seal 100 is shown in accordance with one embodiment of the invention and includes a seal element 102 having a seal element top 104, a seal element bottom 106, a seal element mounting lip 108 and a multi-edge contact interface 110, wherein the seal element mounting lip 108 extends downwardly from the seal element bottom 106. The seal element 102 further includes a seal element sleeve 112 which is securely associated with the seal element 102 via the seal element mounting lip 108. In one embodiment, the seal element sleeve 112 is attached to, fused to or otherwise bonded to the seal element mounting lip 108 via an adhesive bonding, a chemical bonding, a mechanical means of attachment and/or any attachment, fusing and/or bonding method as desired and known in the art and suitable to the desired end purpose.

The seal element 102 defines an axle opening 114 having an axle opening diameter D, wherein the axle opening 114 is located in and/or proximate to the center of the seal element 102, where in one embodiment the axle opening diameter D may be about 0.875 inches. The seal element 102 includes a first surface 116 which may or may not be flat and which extends outwardly from and around the circumference of the seal element sleeve 110. The first surface 116 is angled downwardly from the horizontal at an angle β, wherein β may be about 21° (it is contemplated that other angles between 0° (horizontal) and 90° (downward) may be used as desired) and forms the first edge 118 of the multi-edge contact surface 110. The seal element 102 further includes a second surface 120 which may or may not be flat and which extends outwardly from and around the circumference of the seal element sleeve 110. The second surface 120 is angled downwardly from the horizontal at an angle δ, wherein δ may be about 21° (it is contemplated that other angles between 0° (horizontal) and 90° (downward) may be used as desired) and forms the second edge 122 of the multi-edge contact surface 110. It should be appreciated that the first edge 118 and second edge 122 are separated vertically from each other by a width W, which in one embodiment may be about 0.09 inches (it is contemplated that other Widths W may be used as desired), to form an edge channel 124 which also extends circumferentially around the seal element sleeve 110.

Additionally, the seal element top 104 includes a first raised portion 126 and a second raised portion 128 separated by a first valley portion 130, wherein the first raised portion 126 and second raised portion 128 are located inward from the seal element mounting lip 108 toward the center of the seal element 102. The seal element 102 also includes a substantially flat center portion 132 located between the second raised portion 128 and the axle opening 114. It should be appreciated that each of the first raised portion 126 and second raised portion 128 include a side wall 129 which extends upwardly from the first valley portion 130, wherein the side walls 129 are angled to provide a gradual transition between the first and second raised portions 126, 128 and the first valley portion 130. The axle opening 114 is preferably sized such that the axle opening diameter D is smaller than the diameter of an axle passing there-through by about 20% (range of 10% to 40%). Moreover, it is contemplated that the seal element 102 is preferably constructed from a material that is resilient to sealingly interact act with the axle when the axle is located within the axle opening 114. For example, the seal element 102 may be constructed from a polymer material, such as nitrile, neoprene, plastic, rubber and/or any other material suitable to the desired end purpose. FIG. 2 illustrates the size of a seal element 102 in accordance with one embodiment of the invention, wherein the dimensions shown are in inches.

Referring to FIG. 4 to FIG. 7, an axle seal assembly 200 is shown in accordance with one embodiment of the invention and includes a substantially rigid seal body 202, wherein the seal body 202 includes a first seal body end 204 defining a first seal body end opening 206 and a second seal body end 208 defining a second seal body end opening 210. The seal body 202 is substantially cylindrical in shape and defines a seal cavity 212 having a seal cavity length L, wherein the seal cavity 212 communicates the first seal body end opening 206 with the second seal body end opening 210. The axle seal assembly 200 further includes a first multi-edge axle seal 100, 214 securely associated with the first seal body end 204 and a second multi-edge axle seal 100, 216 securely associated with the second seal body end 208. The first multi-edge axle seal 100, 214 and second multi-edge axle seal 100, 216 are securely associated with the first seal body end 204 and second seal body end 208, respectively, via the seal element sleeve 112 which is securely associated with the seal body 202 to cover the first and second seal body end opening 206, 208, respectively. As such, the axle seal assembly 200 is configured to associate with the axle such that the axle is contained within the seal cavity 212 and extends out of the axle openings 114 of both the first multi-edge axle seal 100, 214 and the second multi-edge axle seal 100, 216.

It should be appreciated that the seal cavity 212 defined between the first multi-edge axle seal 214 and second multi-edge axle seal 216 may have a lubricant deposited therein to further reduce rotational friction and to improve seal integrity, wherein the seal cavity 212 acts as a reservoir for the lubricant. Because the axle opening 114 is smaller than the axle that is contained therein, the material around the axle opening 114 compressingly contacts the axle creating a seal between the seal element 102 and the axle which causes the lubricant to be contained within the seal cavity 212 to provide constant lubricant for the axle.

Figure 8:
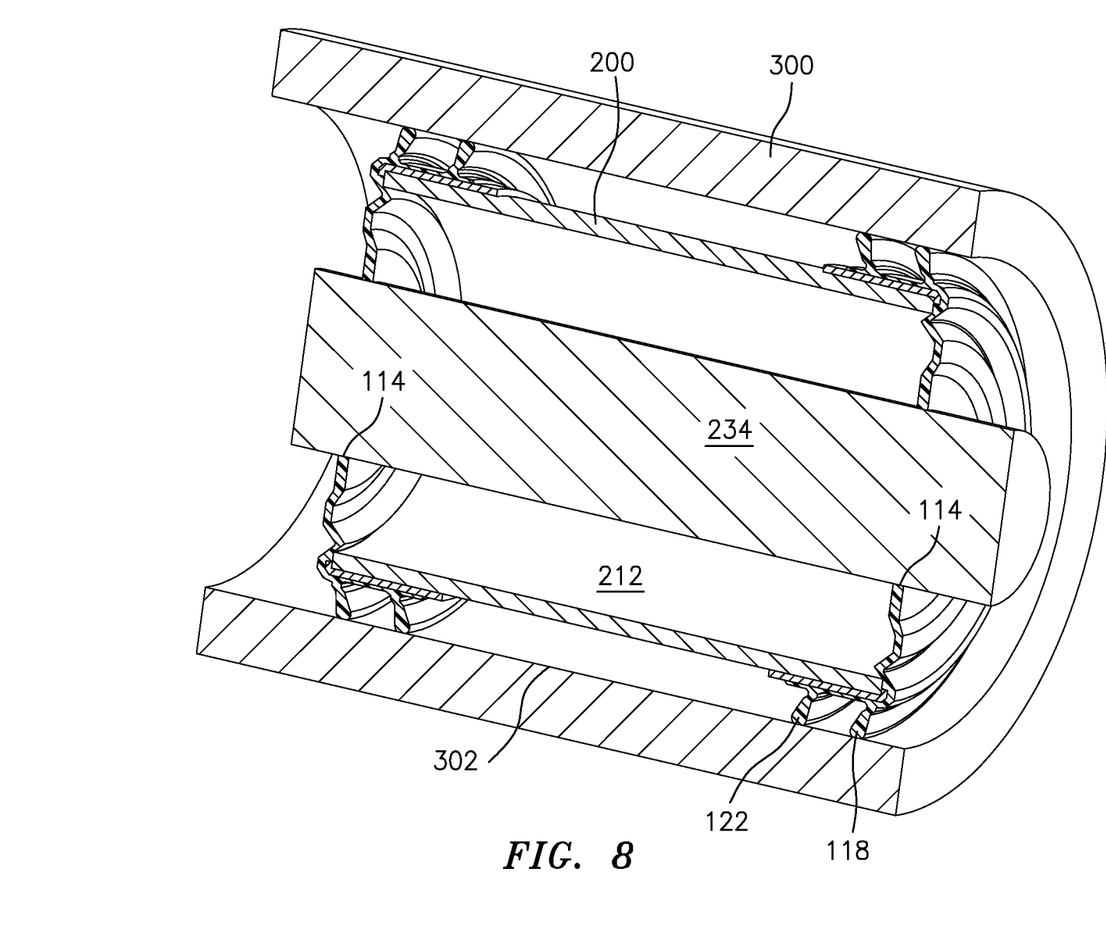
FIG. 8 is a sectional side view of the axle seal assembly of FIG. 4, located within an axle housing and associated with an axle, in accordance with one embodiment of the invention.
Figure 9:
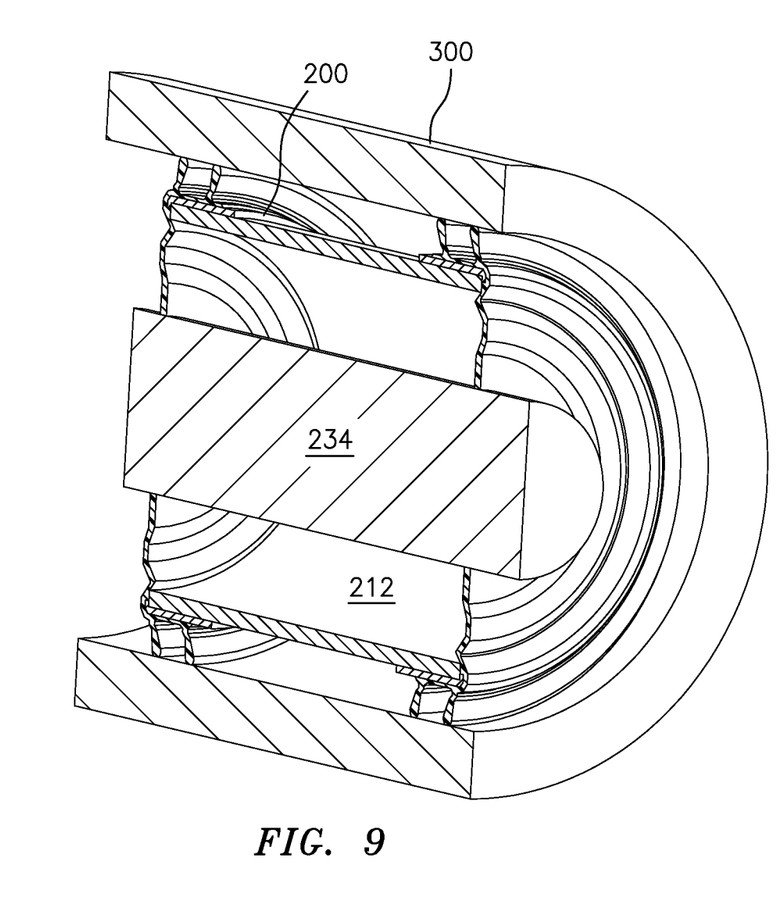
FIG. 9 is a sectional side view of the axle seal assembly of FIG. 4, located within an axle housing and associated with an axle.
Figure 10:
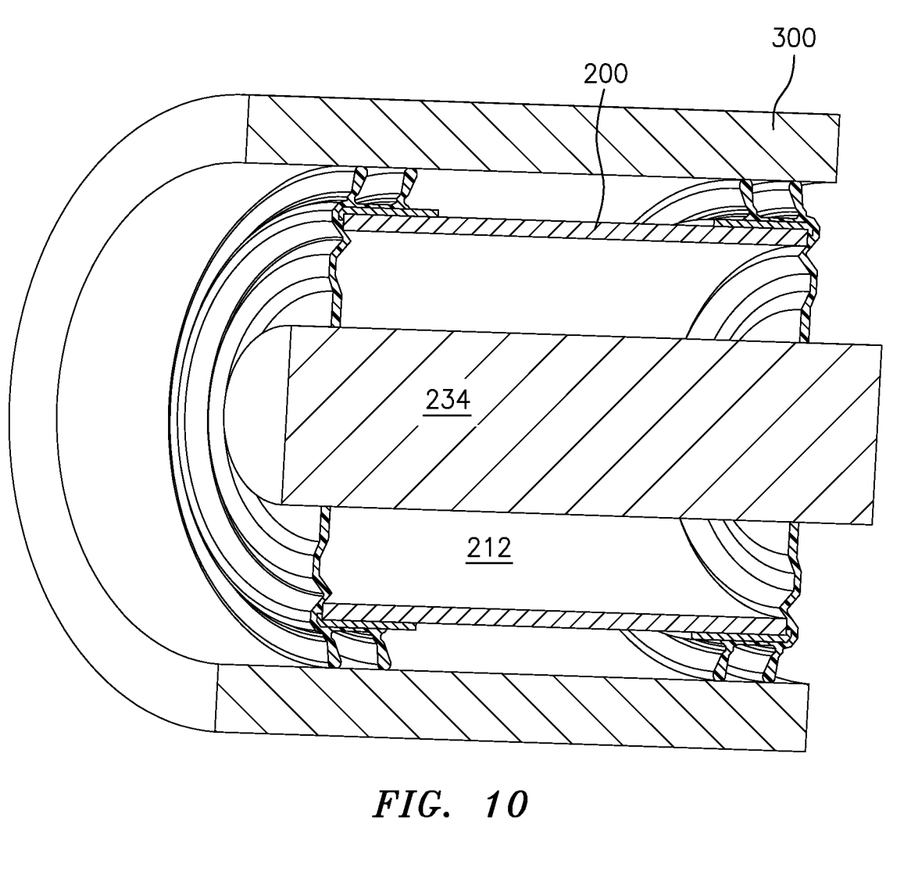
FIG. 10 is a sectional side view of the axle seal assembly of FIG. 4, located within an axle housing and associated with an axle.

Referring to FIG. 8, FIG. 9 and FIG. 10, when the axle seal assembly 200 is located within an axle housing 300, each of the first edge 118 and second edge 122 of the multi-edge contact surface 100 of the seal element 102 is compressed against the inner wall 302 of the axle housing (tube) 300. This advantageously forms a seal between the first edge 118 and second edge 122 of the multi-edge contact surface 100 of the seal element 102 and the inner wall 302 of the axle housing 300. Upon insertion of the axle seal assembly 200 into the axle housing 300, the axle seal 100, 200 will be securely held inside the axle housing (tube). This is due to the friction between the first edge 118 and second edge 122 of the multi-edge contact surface 100 of the seal element 102 and the inner wall 302 of the axle housing 300 (similar to a "finger trap" device). This locking method is what holds the axle seal assembly 200 inside of the axle housing (tube) 300 thus preventing and/or minimizing leakage of lubricant. It should be appreciated that the axle seal assembly 200 is configured to associate with an axle 234 such that the axle 234 is contained within the seal cavity 212 and extends out of the axle openings 114 of both the first multi-edge axle seal 100, 214 and the second multi-edge axle seal 100, 216. When the axle seal assembly 200 is associated with the axle 234, the material of the center portion 132 of the seal element 102 that surrounds the axle opening 114 will heat up (to approximately 270°-300°) as the axle 234 spins upon initial operation. This advantageously causes the material of the center portion 132 that contacts the axle 234 to become harder and more rigid (less pliable), thus preventing and/or minimizing leakage of lubricant from the lubricant reservoir within the seal cavity 212. It should be appreciated that the lubricant within the reservoir within the seal cavity 212 may be any lubricant desired suitable to the desired end purpose, such as a low temperature melt grease. Additionally, the material of the seal element 102 that includes the first raised portion 126, the second raised portion 128 and the first valley portion 130 does not heat up as much as the center portion 132 and remains pliable thereby allowing the seal element 102 to flex during operation of the axle 234. It should be appreciated that the edge channel 124 may advantageously act as a lubricant reservoir and/or a 'catch' channel to prevent/limit debris from going into the seal cavity 212.

Moreover, additional information is provided in the attached appendix where the information does not and is not intended to limit the scope of the invention. Accordingly, all of the information contained herein may be combined together (individually or wholly) or taken singly to achieve varying embodiments of the invention and to add to the scope of the invention without limiting the invention to a particular embodiment.

It should be appreciated that while the invention has been described with reference to an exemplary embodiment, it will be understood by those skilled in the art that some or all of the elements of the embodiments disclosed herein may be combined in whole or in part and that various changes, omissions and/or additions may be made and equivalents may be substituted for elements thereof without departing from the spirit and scope of the invention. In addition, many modifications may be made to adapt a particular situation or material to the teachings of the invention without departing from the scope thereof. Moreover, it is contemplated that elements of one embodiment may be combined with elements of other embodiments as desired. Therefore, it is intended that the invention not be limited to a particular embodiment disclosed herein as the best mode contemplated for carrying out this invention, but that the invention will include all embodiments (individually and/or combined) falling within the scope of the appended claims and/or information. Moreover, unless specifically stated any use of the terms first, second, etc. do not denote any order or importance, but rather the terms first, second, etc. are used to distinguish one element from another.

I claim:

1. An axle seal, comprising:
   an axle seal body defining a first seal body end opening communicated with a second seal body end opening via
      a seal body cavity,
   a seal element having
      a seal element top,
      a seal element bottom,
      a seal element mounting lip which extends downwardly from the seal element bottom, and
      a seal element sleeve, wherein the seal element sleeve is securely and sealingly associated with the seal element mounting lip and the axle seal body, and
      wherein the seal element includes,
         a first surface having a first edge, and
         a second surface having a second edge,
      wherein the first surface and second surface extend circumferentially away from the seal element, and
      wherein the first surface and second surface are separated from each other to form an edge channel which extends circumferentially around the seal element.

2. The axle seal of claim 1, wherein the seal element includes a multi-edge contact surface and a substantially flat center portion, a first raised portion and a second raised portion separated by a first valley portion, wherein the first raised portion and second raised portion are located inward from the multi-edge contact surface toward the center portion.

3. The axle seal of claim 2, wherein each of the first raised portion and second raised portion include a side wall which extends up from the first valley portion, wherein the side wall is angled to provide a gradual transition between the first and second raised portions and the first valley portion.

4. The axle seal of claim 1, wherein axle seal defines a seal element opening, wherein the seal element opening is configured to sealingly associate with an axle having an axle diameter and wherein the seal element opening includes a opening diameter D, wherein the opening diameter D is sized to be between 10% to 40% smaller than the axle diameter.

5. The axle seal of claim 1, wherein the edge channel has a width W ranging between about 0.01 inches and about 2 inches.

6. The axle seal of claim 1, wherein at least a portion of the seal element is constructed from a polymer material.

7. The axle seal of claim 6, wherein the polymer material includes at least one of nitrile, neoprene, plastic, rubber or any combination thereof.

8. The axle seal of claim 1, wherein the seal element is constructed from a resilient and flexible material.

9. The axle seal of claim 1, wherein,
   the first surface is angled downwardly at an angle β ranging between about 0 degrees and about 45 degrees, and
   the second surface is angled downwardly at an angle δ ranging between about 0 degrees and about 45 degrees.

10. An axle seal, comprising:
   an axle seal body having a first seal body end and a second seal body end, wherein the axle seal body defines a seal body cavity, a first seal body end opening and second seal body end opening, wherein the first seal body end opening is communicated with the second seal body end opening via the seal body cavity; and
   a seal element having
      a seal element top,
      a seal element bottom,
      a seal element mounting lip which extends downwardly from the seal element bottom, and
      a seal element sleeve, wherein the seal element sleeve is securely and sealingly associated with the seal element mounting lip, and
      wherein the seal element includes,
         a first surface having a first edge, and
         a second surface having a second edge,
      wherein the first surface and second surface extend circumferentially away from the seal element, and wherein the first surface and second surface are separated from each other to form an edge channel which extends circumferentially around the seal element.

11. The axle seal of claim 10, wherein the seal element includes a multi-edge contact surface and a substantially flat center portion, a first raised portion and a second raised portion separated by a first valley portion, wherein the first raised portion and second raised portion are located inward from the multi-edge contact surface toward the center portion.

12. The axle seal of claim 11, wherein the first raised portion and second raised portion include a side wall which extends up from the first valley portion, wherein the side wall is angled to provide a gradual transition between the first and second raised portions and the first valley portion.

13. The axle seal of claim 10, wherein the seal element opening is configured to sealingly associate with an axle having an axle diameter and wherein the seal element opening includes a opening diameter D, wherein the opening diameter D is sized to be between about 10% to about 40% smaller than the axle diameter.

14. The axle seal of claim 10, wherein the edge channel has a width W ranging between about 0.01 inches and about 2 inches.

15. The axle seal of claim 10, wherein,
the first surface is angled downwardly at an angle $\beta$ ranging between about 0 degrees and about 45 degrees, and
the surface is angled downwardly at an angle $\delta$ ranging between about 0 degrees and about 45 degrees.

16. A seal element for an axle seal body having a first seal body end and a second seal body end, wherein the axle seal body defines a seal body cavity, a first seal body end opening and second seal body end opening, wherein the first seal body end opening is communicated with the second seal body end opening via the seal body cavity, the seal element, comprising:
a seal element top,
a seal element bottom,
a seal element mounting lip which extends downwardly from the seal element bottom, and
a seal element sleeve, wherein the seal element sleeve is securely and sealingly associated with the seal element mounting lip, and
wherein the seal element includes,
a first surface having a first edge, and
a second surface having a second edge,
wherein the first surface and second surface extend circumferentially away from the seal element, and
wherein the first surface and second surface are separated from each other to form an edge channel which extends circumferentially around the seal element.

17. The seal element of claim 16, wherein the seal element is at least partially constructed from at least one of nitrile, neoprene, plastic, rubber or any combination thereof.

18. The seal element of claim 16, wherein the seal element is at least partially constructed from a resilient and flexible material.

19. The seal element of claim 16, wherein,
the first surface is angled downwardly at an angle $\beta$ ranging between about 0 degrees and about 45 degrees, and
the second surface is angled downwardly at an angle $\delta$ ranging between about 0 degrees and about 45 degrees.

20. The seal element of claim 16, wherein the edge channel has a width W ranging between about 0.01 inches and about 2 inches.

* * * * *